United States Patent [19]

Lin et al.

[11] Patent Number: 5,602,214
[45] Date of Patent: Feb. 11, 1997

[54] SILICONE PRESSURE-SENSITIVE ADHESIVE COMPOSITIONS

[75] Inventors: Shaow B. Lin, Schenectady; Stuart R. Kerr, III, Troy, both of N.Y.

[73] Assignee: General Electric Company, Waterford, N.Y.

[21] Appl. No.: 524,147

[22] Filed: Aug. 22, 1995

Related U.S. Application Data

[63] Continuation of Ser. No. 282,856, Jul. 29, 1994, abandoned, which is a continuation of Ser. No. 61,794, May 13, 1993, abandoned.

[51] Int. Cl.$^6$ .................................................. C08F 283/00
[52] U.S. Cl. ........................... 525/478; 525/477; 528/24; 524/264; 524/267; 524/484; 428/421; 428/429; 428/441; 428/447; 428/451
[58] Field of Search .................................... 525/477, 478; 528/24; 524/264, 267, 484; 428/421, 429, 441, 447, 451

[56] References Cited

U.S. PATENT DOCUMENTS

| | | |
|---|---|---|
| 3,929,704 | 12/1975 | Horning . |
| 3,965,136 | 6/1976 | Knollmueller . |
| 3,992,429 | 11/1976 | Knollmueller . |
| 4,058,546 | 11/1977 | Knollmueller . |
| 4,077,993 | 3/1978 | Knollmueller . |
| 4,309,520 | 1/1982 | Blizzard . |
| 4,584,355 | 4/1986 | Blizzard et al. . |
| 4,882,377 | 11/1989 | Sweet et al. . |
| 5,096,981 | 3/1992 | Traver . |
| 5,128,394 | 7/1992 | Traver et al. . |
| 5,175,058 | 12/1992 | Traver . |
| 5,190,827 | 3/1993 | Lin . |

FOREIGN PATENT DOCUMENTS

| | | |
|---|---|---|
| 253601 | 1/1988 | European Pat. Off. . |
| 0253601A | 1/1988 | European Pat. Off. . |
| 393426 | 10/1990 | European Pat. Off. . |
| 459292 | 12/1991 | European Pat. Off. . |
| 506370 | 9/1992 | European Pat. Off. . |
| 0506370A | 9/1992 | European Pat. Off. . |
| 553983 | 8/1993 | European Pat. Off. . |
| 0553983A | 8/1993 | European Pat. Off. . |
| 0581539A | 2/1994 | European Pat. Off. . |
| 02090845 | 7/1982 | United Kingdom . |
| WO8600532A | 1/1986 | WIPO . |

*Primary Examiner*—Melvyn I. Marquis
*Attorney, Agent, or Firm*—Kenneth S. Wheelock

[57] ABSTRACT

Pressure sensitive silicone adhesive compositions having excellent peel adhesive strength, high tack and excellent quick stick capability are provided. Generally the adhesive composition is made of a MQ resin and a silicone gum, to which a silicone fluid is added. A cure catalyst can then be added to the mixture prior to coating.

11 Claims, No Drawings

SILICONE PRESSURE-SENSITIVE ADHESIVE COMPOSITIONS

CROSS REFERENCE

This is a continuation of Ser. No. 08/282,856 filed on Jul. 29, 1994, which is a continuation of Ser. No. 08/061,794 filed on May 13, 1993, both now abandoned.

BACKGROUND OF THE INVENTION

The present invention relates to pressure-sensitive adhesive compositions. More particularly the present invention relates to pressure-sensitive adhesives formed from silicone adhesive compositions having excellent tack and adhesive properties.

The term silicone "pressure sensitive adhesive" (PSA) refers to silicone adhesives that adhere to a surface and then are stripped from the surface without transferring more than trace quantities of adhesive to the surface, and then can be readhered to the same or another surface because the adhesive retains some or all of its tack and adhesive strength. It is recognized that some surfaces in particular applications form a strong bond with the silicone PSA. In these instances, substrate failure can occur when the PSA is stripped. Generally, however, silicone PSA's exhibit clean removeability.

Silicone PSA's have excellent adhesive and cohesive strength and high tack as well as excellent weatherability, temperature stability, excellent electrical properties and chemical resistance. One use for silicone PSA's is splicing tape for substrates such as Teflon® and siliconized surfaces. In coating operations, splicing time is limited, particularly when line speeds are high, so the ability of a silicone PSA to wet out on a surface and then aggressively adhere to it is important. This "on-the-fly" splicing ability of silicone PSA is difficult to measure. Industry-wide tests such as peel adhesion to steel or probe tack adhesion are inadequate for measuring the silicone PSA's performance in application such as splicing. Hence, the loop tack test is selected to demonstrate the ability of a silicone PSA to splice on a selected substrate.

The term "quick stick" refers to a silicon PSA's peel, tack, and loop tack performance. It is desirable to produce a pressure-sensitive adhesive composition exhibiting the ability to adhere to various substrates after a short period of contact.

U.S. Pat. No. 4,309,520, to Blizzard relates to a silicone pressure-sensitive adhesive composition comprising 45-75 parts by weight of a silicone resin and 25-55 parts by weight of a silicone polymer gum, the improvement comprising adding to said composition 0.5 to 50 parts by weight of a cluster compound which contains saterically hindered alkyl groups, based on a total of 100 parts by weight of the resin and polymer gums. These cluster compounds are known in the art.

U.S. Pat. No. 3,992,429, to Knollmueller discloses alkoxysilicone multiple cluster compounds and their preparation.

U.S. Pat. No. 4,077,993, to Knollmueller discloses an improved method for preparing alkoxysilicone multiple cluster compounds.

U.S. Pat. No. 5,190,827, to Lin relates to silicone pressure-sensitive adhesive compositions having high solids contents comprised of a MQ resin, an alkenyl-silicone fluid, and a hydride-silicone fluid, and cured by a platinum catalyst.

U.S. Pat. Nos. 5,175,058 and 5,096,981 to Traver relate to pressure-sensitive adhesives made from polydioganosiloxanes gum, and requiring the use of primers.

U.S. Pat. No. 3,929,704 to Horning relates to silicone pressure-sensitive adhesive and comprising a silicone resin, a silicone gum and a catalytic amount of a curing agent, said curing agent comprising from about 10 to about 90% by weight of 2,4-dichlorobenzoyl peroxides, a plasticizer and an extender.

U.S. Pat. No. 4,882,377 to Sweet et al, relates to low viscosity pressure-adherent silicone elastomer compositions.

All of the above mentioned compositions fail to exhibit the unique combination of quick stick property and peel and tack adhesion as found in the present invention.

It is desirable to provide silicone compositions which upon curing form a pressure sensitive adhesive with the capability to develop rapid and strong adhesion properties to the substrates.

It is further desirable to provide silicone compositions which upon curing form pressure sensitive adhesive tapes with improved loop tack adhesion property while the peel and probe tact adhesions are acceptable. Of particular use for the PSA tapes is as splicing tapes.

One aspect of the present invention is the production of silicone PSA's exhibiting a combination of high peel, tack, and excellent loop tack performance.

SUMMARY

The present invention is directed to a PSA composition comprising a silicone adhesive composition, a silicone fluid that is compatible with the silicone adhesive composition, and a cure catalyst. The fluid is generally present in an amount from about 2 to about 30 parts by weight, based upon the total weight of the silicone adhesive composition solids of 100 parts. The cured adhesive exhibits rapid and strong adhesion as measured in loop tack adhesion while maintaining good peel and probe tack adhesion properties. The incorporation of silicone fluid in the cured matrix of the silicone adhesive provides a PSA with exceptional quick stick.

This PSA composition comprises a silicone adhesive composition, a silicone fluid compatible with the silicone adhesive composition, and a cure catalyst. The composition forms a pressure-sensitive adhesive exhibiting rapid adhering characteristics as well as excellent peel and tack adhesion properties.

The present invention provides for a pressure sensitive adhesive composition comprising:

(A) a silicone adhesive composition comprising
  (i) about 45 to about 75 percent of a resin copolymer consisting primarily of $R_3SiO_{1/2}$ and $SiO_{4/2}$ units and containing up to 5 molar percent of $R_2SiO$ and $RSiO_{3/2}$ units, wherein each R individually is a hydrocarbon radical containing up to 6 carbon atoms and wherein there are from 0.6 to 0.9 $R_3SiO_{1/2}$ units for every $SiO_{4/2}$ units and wherein the resin comprises from about 0.2% to about 5.0% by weight, based upon the total resin weight of hydroxy radicals, and (ii) about 25 to 55 percent of a silicone polymer gum having the formula:

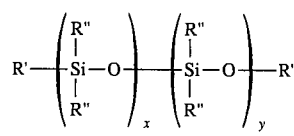

where each R" is independently selected from alkyl, alkenyl, phenyl, aryl, arylalkyl, each R' is either a hydroxy or R", wherein the sum x+y is a number sufficient to give silicone gum a viscosity of from about 800,000 cps to about 200,000,000 cps at 25° C., and the total solids weight of (A) (i) and A (ii) being 100 parts, and optionally (iii) an organic solvent; and (B) about 2 to about 30 parts by weight, based on the total weight of A (i) and A (ii) being 100 parts, of silicone fluid, wherein said fluid is compatible with said silicone adhesive composition (A).

DETAILED DESCRIPTION OF THE INVENTION

The silicone adhesive composition of the present invention is made from a siloxane resin, a silicon polymer and optionally an organic solvent.

Silioxane resins are known in the art. These resins are generally referred to as MQ resins are soluble in aromatic solvents and contain M units, represented by the formula $R_3SiO_{1/2}$, and Q units, represented by the formula $SiO_{4/2}$. It is recognized that while MQ resins are primarily made from M and Q units, there can be up to 5 mole percent D units, represented by the formula $R_2SiO$ and T units, represented by the formula $RSiO_{3/2}$. R is a monovalent hydrocarbon radical. Examples of radicals represented by R include those radicals having from about 1 to about 6 carbon atoms, such as alkyl radicals including methyl, ethyl, and isopropyl; alkenyl radicals including ethylene, propenyl, and hexenyl; cycloaliphatic radicals such cyclopentyl cyclohexenyl; olefinic-containing radicals such as vinyl and allyl; and olefinic radical. R is preferably methyl. The MQ resin is preferably a silanol-containing MQ resin having an M to Q ratio from about 0.6:1 to about 0.9:1. The silicon bonded hydroxy group or the silanol content in the MQ resin is generally from about 0.2% to about 5%, preferably from about 1% to about 3%, and most preferably from about 1.5% to about 2.5% by weight of the total weight of the MQ resin.

The amount of MQ resin present in the composition of this invention is from about 45 to about 75 weight percent, preferably from about 50 weight percent to about 70 weight percent, and still more preferably from about 50 weight percent to about 65 weight percent of the total silicone weight.

Methods for making the siloxane resin are known in the art. U.S. Pat. No. 2,676,182 to Daudt et al. discloses a method in which a silica hydrosol is reacted under acidic conditions with a source of triorganosiloxy units such as hexaorganodisiloxane, e.g., hexamethyldisiloxane, or hydrolyzable triorganosiloxane, e.g. trimethylchlorosiloxane or mixtures thereof, and recovering a benzene soluble resin copolymer having M and Q units.

The MQ resin is commercially available in solution form in a solvent such as xylene or toluene, generally at a 40% to 60% by weight solution. The MQ resin is physically mixed with a silicone gum in organic solvent to form the silicone adhesive composition of the present invention.

The silicone polymer gum of the present invention is generally referred to as a high molecular weight gum. The term "gum" refers to a high viscosity material having a viscosity from about 800,000 centipoise (cps) to about 200,000,000 centipoise at 25° C., using a viscosity meter such as a Rheometrics rheometer.

The silicone gum of the present invention is well-known to the art and is one or more polydioganosiloxanes. The silicone gum can generally be represented by the following formula:

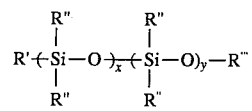

wherein each R" can be independently selected from an alkyl, alkenyl, phenyl, aryl and arylalkyl. R'" is either a hydrogen or radicals being methyl. The sum of x+y must be high enough so that the silicone gum has a viscosity from about 800,000 cps to about 200,000,000 cps at 25° C. Most preferably, the silicone polymer gum is a silanol-stopped polydimethylsiloxane.

The polydiorganosiloxane for use in the present invention can be prepared by any of the methods known in the art. For example, the polydiorganosiloxanes can be prepared according to the method set forth in U.S. Pat. No. 2,814,601 which is herein incorporated by reference. Generally an appropriate siloxane is reacted with an aqueous acid in a closed system until the viscosity of the siloxane has become essentially constant. The product is then washed free of acid.

The adhesive composition of the present invention can be prepared by heating to reflux e.g., at a temperature of 130° C., and cooking for about two to three hours a mixture of the resin, silicone polymer gum and an organic solvent in the presence of a base catalyst. The water formed during the condensation reaction is then removed. The resulting mixture is cooled, its solids content is adjusted, and the mixture is neutralized with acid.

The organic solvent used in the preparation of the silicone adhesive composition can be any of the solvents conventionally used with organosilanes and having a boiling point below approximately 250° C., such as aromatic hydrocarbons, e.g., benzene, toluene, and xylene; aliphatic hydrocarbons, e.g., hexane, heptane, and cyclohexane; and halogenated hydrocarbon solvents, e.g., trichloroethane and chloroform.

Suitable base catalysts for preparing the silicone adhesives include, for example, alkali metal hydroxides, e.g., sodium hydroxide, potassium hydroxide and the like; an aminofunctional silanes such as those disclosed in U.S. Pat. No. 4,906,695 to Blizzard et al., which is hereby incorporated by reference. Suitable aminofunctional silanes include, for example, N-gamma-aminopropyltriethoxysilane, N-beta-aminoethyl-gamma-aminoisobutyltrimethoxysilane, and N-beta-aminoethyl-gammaaminopropyltrimethoxysilane.

The preferred catalyst is sodium hydroxide, preferably in the form of an aqueous solution. The amount of base catalyst should be in the range of about 10 to about 40 ppm, preferably about 20 ppm, based on the combined weight of the resin and polymer.

Suitable acids for neutralizing the condensed mixture include mineral acids, such as hydrochloric acid, phosphoric acid, and the like and organic acids such as acetic acid, acetyl chloride, and the like The resin to gum ratio in the silicone adhesive composition ranges from about 45:55 to 75:25 based upon a solid weight basis. Silicone adhesive compositions are typically prepared in solvents such as toluene and xylene, although other hydrocarbon solvents can be used.

The composition of this invention can further comprise a rare earth metal salt of a fatty acid. This component acts to improve the high temperature adhesive performance of the pressure-sensitive adhesive of this invention.

Examples of rare earth metals suitable for forming the salt include cerium, lanthanum, praseodymium, and the like. The preferred rare earth metal cerium.

The fatty acid preferably contains about 6 to about 18 carbon atoms, most preferably about 8 carbon atoms. Thus, the preferred rare earth metal salt for use in the present invention is cerium octoate.

Generally, rare earth metal salt can be used in the composition of this invention in an amount sufficient to provide the composition with an amount of rare earth metal within the range of from about 10 to about 500 parts per million, based on the combined weight of solid resin and silicone gum. The benefit of having rare earth metal in the adhesive composition is disclosed in the patent application filed Jun. 8, 1992, Ser. No. 07/895,297, abandoned.

Typically, the rare earth metal salt is used in the composition of this invention in the form of a 30% solution, 6% of which is composed of the active rare earth metal. Examples of suitable solvents for the rare earth metal solution include, for example, hexane, heptane, toluene, xylene, mineral spirits and ketones.

The rare earth metal salt is added to the silicone adhesive mixture and solvent slowly in increments with agitation to get proper dispersion. Because rare earth metal salt is a base scavenger, it is necessary that the mixture be neutral or slightly acid before the rare earth metal salt is added.

To the silicone adhesive composition formed, a silicone fluid which is compatible with the silicone adhesive composition is added, in an amount of from about 2 to about 30 parts by weight based 100 parts of silicone adhesive composition solids.

The term "compatible" means the silicone fluid will exist in a fairly uniform, dispersed state in the composition of this invention while participating in the curing reaction, until cure has been effected.

The silicone fluid can be characterized in that it is flowable at 25° C. The viscosity of the silicone fluid is about 500M cps or lower, and preferably it is 100M cps or less, at 25° C.

Silicone fluids for use in the current invention typically contain units which can be represented by the following formula:

$R^1R^2_2Si(OSiR^1_2)_m(OSiR^3R^4)_nOSiR^2_2R^1$ or (2) copolymers comprising
$R^1R^2_2SiO_{1/2}$, $R^1_2SiO_{2/2}$, $R^3R^4SiO_{2/2}$, or $R^1SiO_{3/2}$ units, wherein each $R^2$ independently is an alkyl, aryl, or arylalkyl group having up to 10 carbon atoms; and wherein $R^1$, $R^3$, and $R^4$ each having up to 10 carbon atoms are independently selected from alkyl, aryl, arylalkyl, alkenyl, hydroxy, hydroxyalkyl, allyl, hydrogen, epoxide-containing aliphatic, cycloaliphatic or aromatic, amine, aminocarboxy, and fully- or partially fluorinated alkyl, alkenyl, or aryl. A preferred fluid is dimethylsilicone. The sum of n+m is such that the viscosity of the fluid is up to about 500,000 cps viscosity.

Silicone fluids for use in the present invention typically can include any fluid known to the art. Two exemplary types of silicone fluids can include alkenyl-terminated polydiganosiloxanes or organohydrogen polysiloxanes. Alkenyl-terminated polydioganosiloxanes can be prepared by any of the conventional methods for preparing trioganosiloxanes-terminated polydioganosiloxanes. For example, a proper ratio of the appropriate hydrolyzable silanes e.g., vinyldimethylchlorosilane and dimethyldichlorosilane, may be co-hydrolyzed and condensed or alternately an appropriate 1,3-divinyltetraorganodisiloxane, e.g., symmetrical divinyldimethyldiphenylsiloxane or divinyltetramethylsiloxane, which furnished the endgroups of the polydiorganosiloxane, may be equilibrated with an appropriate diorganopolysiloxane, e.g. octamethylcyclotetrasiloxane, in the presence of an acidic or basic catalyst. Regardless of the method of preparation of polydiorganosiloxane, there is usually coproduced a varying quantity of volatile, cyclic polydiorganosiloxanes. It is desirable to remove volatile cyclic polydiorganosiloxanes, e.g. methyl tetramer, since they are volatile and can adversely affect pressure sensitive adhesive properties.

Another type of silicone fluid includes organohydrogen polysiloxanes. Organohydrogenpolysiloxanes can be prepared by any method known to the art. The preparation of organohydrogensiloxanes can be accomplished in any suitable manner such as by hydrolyzing silanes, such as chlorosilanes, and equilibrating the resulting hydrolyzate under acid catalysis. Alternatively, a mixture of suitable siloxanes, such as cyclic siloxanes and linear siloxanes, can be copolymerized and equilibrated under acid catalysis. For example, a hydride-stopped silicone fluid suitable for use in the present invention can be prepared by reacting tetramethyldisiloxane and cyclic methyl tetramer of predetermined ratio in the presence of a catalyst for 4–6 hours at 80°–100° C. The catalyst is then removed by filtration and the residual reactants are removed by vacuum stripping. It is contemplated that other functional groups may be incorporated into the silicone fluids by methods known to those skilled in the art. These functional groups can include vinyl, hydride, epoxide, amine and fluoro function groups. The preferred silicone fluid is polydimethylsiloxane, and most preferably silanol-containing polydimethylsiloxane.

The compositions of the present invention can optionally further comprise from about 20% to about 70% by weight, preferably from about 0% to about 60% by weight, and most preferably from 40% to about 50% by weight of an organic solvent. Suitable organic solvents include any of the solvents conventionally used with organsiloxanes and have a boiling point below approximately 250° C., such as aromatic hydrocarbons, e.g., benzene, toluene and xylene; aliphatic hydrocarbons such as hexane, heptane, and cyclohexane; halogenated hydrocarbon solvents such as trichloroethane and chloroform; naphthas such as petroleum ether, and oxygenated solvents such as hydocarbon ethers, e.g., tetrahydrofuran and the dimethylether of ethylene glycol; ketone such methyl, isobutyl ketone and esters such as ethyl acetate and the like. Mixtures of organic solvents can also be used.

The components of the compositions of this invention can be mixed in any manner such as in bulk or in organic solvent. The MQ resin is a solid and is conveniently prepared and handled in an organic solvent, the preparation of the composition of this invention preferably uses an organic solvent for the mixing of the MQ resin and siloxane gum. The mixing of the components can be accomplished by any of the techniques known in the art, such as milling, blending, stirring, and the like, either in batch or in continuous process.

A composition of this invention can be prepared, with or without the aid of solvent, by simply mixing the MQ resin, silicone gum, and catalyst together in the stated proportion. The order of mixing of the components is not critical.

Small amounts of additional ingredients may be added to the composition of this invention if desired. For example, antioxidants, pigments, stabilizers, fillers, and the like, may be added as long as they do not materially reduce the pressure-sensitive adhesive properties of these compositions.

The preferred silicone adhesive composition is a condensed solution mixture of silanol-containing oganosiloxane gum with a silanol-containing MQ resin with a M:Q ratio ranging from 0.6:1 through 0.9:1. One skilled in the art would recognize that many possible mechanisms are at play in the adhesive compositions of the present invention. Without being limited to any one theory, it is believed that the silanol functionality plays a strong role in the formation of a condensed resin and gum; and the cure catalyst plays a strong role in the formation of a cross-linked matrix.

The cure catalyst is generally a compound that generates radicals to initiate curing or crosslinking within the silicone adhesive composition. Specific catalysts include benzoyl peroxide, cumyl peroxide, 2,4dichlorobenzoyl peroxide acetyl and azo compounds including 2,2'-azobisisobutyronitrile (AIBN) and the like. The amount of cure catalyst is generally an amount effective to promote the cure of silicone adhesive and is typically about 0.5 to about 3.0% by wt. of silicone solids and preferably from about 1.5 to about 2.5% by wt. of silicone solids of the adhesive.

The adhesive composition is applied to the surface of a suitable substrate in any convenient manner such as by roll coating by Knife-overroll coating, gravure coating and the like, by dipping the base member in solution, or by brushing or spraying solution on the surface.

The amount of adhesive material applied to the surface can be varied to conform to the circumstances. Generally sufficient adhesive is applied to render the surface tacky to the touch after removing the solvent. After applying it to the surface, the adhesive may be cured by air drying or by heating at temperatures ranging up to 300° C. Heating will hasten removal of the solvent and also tends to increase the cohesive strength of the adhesive film. After curing, the surfaces to be adhered are brought together. No further curing is needed in order to establish a firm bond between them.

The compositions of this invention are useful as pressure sensitive adhesives and will readily stick to a solid support, whether flexible or rigid.

The surface of the support and the substrate to which the support is adhered may be any known solid material such as metals, such as aluminum, silver, copper, iron and their alloys; porous materials such as paper, wood, leather, and fabrics; polyimide, polyetherimide, organic polymeric materials such as polyolefins, such as polyethylene and polypropylene, fluorocarbon polymers such as polytetrafluoroethylene and polyvinylfluoride, silicone elastomers, silicone resins, polystyrene, polyamides such as nylon, polyesters and acrylic polymers; painted surfaces; siliceous material such as concrete, bricks, cinderblocks, and glass such as glass cloth; etc. Porous materials such as glass cloth are often impregnated with a substance that will prevent the migration of the PSA from one surface to another surface of the support. It is also well known to chemically treat the surface of fluorocarbon polymer support to enhance the adhesion of a PSA to said surface.

Examples of articles made with the PSA composition of the present invention include pressure-sensitive adhesive tapes, labels, emblems and other decorative materials. One specific example includes splicing tapes which must withstand high temperature and very fast lines speeds resulting in high stress to the tapes.

A preferred article is a pressure-sensitive adhesive tape comprising an impregnated glass cloth, a polyester polymer, or a chemically treated fluorocarbon polymer support carrying on at least one surface thereof the cured compositions of this invention.

"Legging" phenomena may occur wherein some adhesive coating delaminates and transfers to the backside of the tape. During slitting operations, a "webbing" phenomena can occur, wherein the adhesive coating resists slitting, resulting in unwanted adhesive delamination along the slit edge. Both legging and webbing can be eliminated if the adhesive layer is sufficiently primer-bonded to the surface of the tape substrate. A primer which can be used in this invention is SS4191 primer, available from General Electric Company. The SS4191 primer is a toluene solution of a curable dimethyl polysiloxane having a viscosity of 10,000–18,000 centipoise at 25° C. The solids content of the primer is about 29–31%. The SS4191 primer is normally used at a bath concentration of 3–10% solids. The SS4191 primer is used in combination with a catalyst, i.e., SS4192c catalyst, available from General Electric Company, and an accelerator, i.e., SS4259c accelerator, also available from General Electric Company. The SS4192c catalyst is a 50% xylene solution of dibutyltin diacetate. The SS4259c accelerator is a toluene solution of methyl-2-dimethylaminoethoxy polysiloxane chain-stopped with trimethylsiloxy groups.

The following primer formulation and coating has been found to provide excellent anchorage of the PSA to a substrate:

| | |
|---|---|
| SS4191 primer | 10 parts by weight |
| SS4192c catalyst | 0.5 parts by weight |
| SS4259c accelerator | 0.5 parts by weight |
| Toluene | 72 parts by weight |
| Hexane | 18 parts by weight |

The SS4191 primer is diluted with the toluene and hexane prior to the addition of the catalyst and accelerator. The ingredients are mixed thoroughly. The primer composition is applied to the substrate and cured for 30 seconds at 125° C.

The primer can be applied to the substrate by conventional methods well-known in the art, e.g., spraying, roll coating, dip coating, brushing, and other art-recognized techniques.

The present invention is further directed to pressure sensitive adhesive formed from the cure of the composition of this invention. In addition, the present invention is directed to articles of manufacture containing a solid support having deposited on at least one surface thereof the pressure sensitive adhesive of this invention. The preferred article of manufacture within the scope of this invention is a pressure sensitive tape containing a flexible material having deposited on at least one surface thereof the pressure sensitive adhesive of this invention.

One method of preparing the silicone adhesive of the present invention is outlined in Example 1.

EXAMPLE 1

A silicone adhesive composition was prepared by adding to a clean reactor 568 g of a MQ resin solution (60% solids in toluene) 258 g of dimethyl silicone gum, and 172 g of toluene. The mixture was stirred until a homogenous solution was obtained. Sodium hydroxide was added to the solution as a catalyst. The solution was heated to reflux. After two hours at reflux, the solution was neutralized with H₃PO₄ and adjusted to a 60% solids level.

Example 2 illustrates the curing of the silicone adhesive composition of Example 1 without the addition of silicone fluid.

EXAMPLE 2

The catalyzed silicone composition was prepared as follows: 40 g of the silicone adhesive composition was charged into a vessel. A toluene solution containing 0.48 g of benzoyl peroxide was added. The solution was thoroughly mixed, and than coated onto a one mil thick polyester film. A dry adhesive of between 1.5 and 1.9 mil thickness was formed. The adhesive was cured for 90 seconds in a 95° C. oven, and then for 90 seconds at 177° C. Table 1 shows the physical properties of the adhesive.

The test methods used to characterized the PSA include the following: Peel adhesion against steel plate was determined with a Scott tester, using 180° pull at a rate of 12 inch per minute, according to ASTM-D3330.

Probe tack performance was measured by a Polyken Probe Tack Tester (TMI 8–021) using a probe of 0.5 cm diameter at a contact pressure of 14.5 psi, and probe speed of 1 cm/s, and a dwell time of one second.

Quick stick is measured by performing loop tack testing against a silicone release coating paper substrate. The reference silicone release coated paper is a standard product No. 8714 of H. P. Smith Division (James River Co.). The loop tack test was done on a loop tack tester of Chemsultants International according to the TLMI Loop Tack Tester.

The cured adhesive of Example 2 had peel strength against a steel plate of 45 oz/in: a probe tack of 726 g/cm²; and a loop tack of 1.8 oz.

Example 3–7 exhibit the addition of dimethylsilicone fluids to the PSA formed in Example 1.

EXAMPLES 3–7

Table 1 illustrates a series of mixtures with variable weight % of dimethyl silicone fluid that was added to a 40 g mixture from Example 1. The catalyzed mixtures of this series were prepared and the cured adhesive tapes made from them were also prepared as described in Example 2. The additive viscosity was also included,

TABLE 1

| Expt. No. | g add. | Wt. % add. | Add. viscosity (cps @ 25° C.) | Loop tack (oz/in) | Peel (oz/in) | Probe tack (g/cm²) |
| --- | --- | --- | --- | --- | --- | --- |
| 2 | — | — | — | 1.8 | 45 | 726 |
| 3 | 0.72 | 3.0 | 1,000 | 4.1 | 43 | 720 |
| 4 | 1.20 | 5.0 | 1,000 | 8.8 | 45 | 659 |
| 5 | 2.4 | 10.0 | 1,000 | 11.8 | 30 | 580 |
| 6 | 3.6 | 15.0 | 1,000 | 12.4 | 24 | 555 |
| 7 | 4.8 | 20.0 | 3,000 | 11.6 | 20 | 465 |

The results from Table 1 indicate that the addition of silicone fluid led to an increased loop tack performance that is proportional to the weight % of the fluid incorporated.

EXAMPLES 8–11

Silanol-containing polydimethylsilokane silicone fluids were incorporated into a 40 g mixture prepared in accordance with Example 1. Adhesive tapes were prepared in accordance with Example 2. The results can be seen in Table 2.

TABLE 2

| Expt. No. | Wt. % add. | Add. viscosity (cps @ 25° C.) | Loop tack (oz/in) | Peel (oz/in) | Probe tack (g/cm²) |
| --- | --- | --- | --- | --- | --- |
| 8 | 5.0 | 35 | 2.4 | 44 | 772 |
| 9 | 5.0 | 3,000 | 5.6 | 36 | 602 |
| 10 | 5.0 | 30,000 | 4.5 | 37 | 648 |
| 11 | 5.0 | 125,000 | 4.1 | 42 | 617 |

The cured tapes showed improved loop tack adhesive property, compared to the properties of the adhesives of Example 2.

EXAMPLES 12–16

Adhesives were prepared and tested in accordance with Example 2, using silicone fluids containing various functional groups. The mixtures seen in Table 3 contained 5 weight % of the specified silicone fluid.

TABLE 3

| Expt. No. | Attached group | Add. viscosity (cps @ 25° C.) | Loop tack (oz/in) | Peel (oz/in) | Probe tack (g/cm²) |
| --- | --- | --- | --- | --- | --- |
| 12 | vinyl | 3600 | 7.1 | 35 | 643 |
| 13 | hydride | 1800 | 7.7 | 33 | 712 |
| 14 | epoxide | 367 | 6.0 | 39 | 664 |
| 15 | amine | 2500 | 11.3 | 35 | 720 |
| 16 | fluoro | 1228 | 2.6 | 46 | 786 |

Loop tack property of the cured adhesives is improved compared to that of the adhesive formed in accordance with Example 2.

It is understood that other modifications will be apparent to and can be readily made by those skilled in the art without departing from the scope and spirit of the present invention. Accordingly, it is not intended that the scope of the claims appended hereto be limited to the descriptions set forth above but rather that the claims be construed as encompassing all of the features of patentable novelty which reside in the present invention, including all features which would be treated as equivalence thereof by those skilled in the art to which the invention pertains.

What is claimed is:

1. A curable pressure sensitive adhesive (PSA) composition having improved quick stick properties consisting essentially of:

(A) a silicone adhesive composition consisting essentially of:

(i) about 45 to 75 percent of a resin copolymer consisting primarily of $R_3SiO_{1/2}$ and $SiO_{4/2}$ units and containing up to 5 molar percent of $R_2SiO_{2/2}$ and $RSiO_{3/2}$ units, wherein each R individually is hydrocarbon radical containing up to 6 carbon atoms and wherein there are from 0.6 to 0.9 $R_3SiO_{1/2}$ units for every $SiO_{4/2}$ units and wherein the resin comprises from about 0.2% to about 5.0% by weight, based upon the total resin weight of hydroxy radicals, and (ii) about 25 to about 55 percent of a silicone polymer gum having the formula

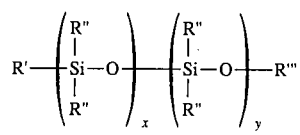

where each R" is independently selected from alkyl, alkenyl, phenyl, aryl or arylalkyl, R''' is either a hydrogen or $R^{11}$, R' is either a hydroxy or R", wherein the sum x+y is a number sufficient to give silicone gum a viscosity of from about 800,000 cps to about 200,000,000 cps at 25° C., and the total solids weight of (A)(i) and (A)(ii) being 100 parts, and optionally (iii) an organic solvent; and (B) about 2 to bout 30 parts by weight, based on the weight of (A)(i) and (A)(ii) being 100 parts, of silicone fluid of the general formula
$R^1R^2{}_2Si(OSiR^1{}_2)_m(OSiR^3R^4)_nOSiR^2{}_2R^1$ or copolymers comprising
wherein each $R^2$ independently is an alkyl, aryl, or arylalkyl group having up to 10 carbon atoms; and wherein $R^1, R^3$, and $R^4$ each having up to 10 carbon atoms and independently selected from alkyl, aryl, aryalkyl, alkaryl, hydroxy, hydroxyalkyl, allyl, hydrogen, epoxide-containing-aliphatic, cycloaliphatic, aromatic, amine, aminocarboxy, fully- or partially fluorinated alkyl, alkenyl or aryl, and wherein n+m is such that the viscosity of the fluid is between 35 and 100,000 cps at 25° C., wherein said fluid is compatible with said silicone adhesive composition (A).

2. A curable PSA composition of claim 1 further comprising a catalyst that generates radicals.

3. A curable PSA as in claim 1, wherein the amount of silicone fluid is from about 2 to about 20% by weight based upon the total weight of (A)(i) and (A)(ii) silicone solids.

4. A curable PSA as in claim 1, wherein the amount of silicone fluid is from about 3 to about 15% by weight based upon the total weight of (A)(i) and (A)(ii) silicone solids.

5. A curable PSA composition as in claim 1, wherein said silicone fluid is a silanol-containing dimethylsilicone fluid.

6. A curable PSA composition as claim 5, wherein said silicone polymer gum is a silanol-containing dimethylsiloxane.

7. A curable PSA composition as in claim 1 wherein said organic solvent is toluene or xylene.

8. A flexible substrate carrying on at least one surface the PSA of claim 2.

9. A PSA composition as in claim 2, wherein said catalyst is benzoyl peroxide.

10. A substrate as in claim 8 wherein said substrate is paper, a polyester polymer, a polyimide polymer, a glass cloth, a polyolefin polymer, or a chemically treated fluorocarbon polymer support.

11. A flexible substrate further comprising a primer layer, wherein the primer layer is situated on the surface of the flexible material and the pressure sensitive adhesive of claim 2 is situated on the surface of the primer layer.

* * * * *